United States Patent
Mok et al.

(10) Patent No.: US 9,674,799 B2
(45) Date of Patent: Jun. 6, 2017

(54) APPARATUS AND METHOD FOR DEVICE TO DEVICE COMMUNICATION BASED ON APPLICATION PROGRAM REQUIREMENTS IN A WIRELESS NETWORK

(71) Applicant: Samsung Electronics Co., Ltd., Gyeonggi-do (KR)

(72) Inventors: Young-Joong Mok, Gyeonggi-do (KR); Jung-Shin Park, Seoul (KR); Seung-Hoon Park, Seoul (KR); Young-Bin Chang, Gyeonggi-do (KR); Kyung-Kyu Kim, Gyeonggi-do (KR); Hyun-Seok Ryu, Gyeonggi-do (KR); Sang-Kyu Baek, Gyeonggi-do (KR); Chi-Woo Lim, Gyeonggi-do (KR)

(73) Assignee: SAMSUNG ELECTRONICS CO., LTD, Suwon-si, Gyeonggi-Do (KR)

(*) Notice: Subject to any disclaimer, the term of this patent is extended or adjusted under 35 U.S.C. 154(b) by 93 days.

(21) Appl. No.: 14/247,085

(22) Filed: Apr. 7, 2014

(65) Prior Publication Data

US 2014/0302791 A1    Oct. 9, 2014

(30) Foreign Application Priority Data

Apr. 5, 2013 (KR) .................. 10-2013-0037208

(51) Int. Cl.
*H04W 52/38* (2009.01)
*H04W 8/00* (2009.01)
(Continued)

(52) U.S. Cl.
CPC ......... *H04W 52/383* (2013.01); *H04W 8/005* (2013.01); *H04W 4/008* (2013.01);
(Continued)

(58) Field of Classification Search
CPC . H04W 52/383; H04W 48/16; H04W 76/023; H04W 8/005; H04W 4/005; H04L 67/104
See application file for complete search history.

(56) References Cited

U.S. PATENT DOCUMENTS

2002/0044533 A1    4/2002  Bahl et al.
2003/0097460 A1*   5/2003  Higashiyama ...... H04L 12/5695
                                                       709/232
(Continued)

OTHER PUBLICATIONS

3GPP, "TR 22.803 v 12.0.0", Dec. 2012, pp. 1-40.*
(Continued)

*Primary Examiner* — Devan Sandiford

(57) ABSTRACT

A method for supporting an application by Device to Device (D2D) communication in a wireless network includes acquiring range control information from an application upon selection of the application installed in the source device, controlling transmission power of a discovery signal for discovering a target device to conduct D2D communication, based on range control information defined for the selected application, and transmitting the discovery signal with the controlled transmission power. An apparatus includes a controller configured to acquire range control information from an application upon selection of the application installed in the source device, and control transmission power of a discovery signal for discovering a target device to conduct D2D communication, for the selected application based on range control information defined for the selected application, and a transmitter configured to transmit the discovery signal with the controlled transmission power.

20 Claims, 4 Drawing Sheets

(51) Int. Cl.
  *H04W 52/24* (2009.01)
  *H04W 4/00* (2009.01)
  *H04W 76/02* (2009.01)
  *H04W 52/26* (2009.01)
  *H04W 52/32* (2009.01)

(52) U.S. Cl.
  CPC ........ *H04W 52/267* (2013.01); *H04W 52/325* (2013.01); *H04W 76/023* (2013.01)

(56) References Cited

U.S. PATENT DOCUMENTS

| | | | |
|---|---|---|---|
| 2003/0135638 A1* | 7/2003 | Brabson | H04L 41/0893 709/232 |
| 2004/0152420 A1 | 8/2004 | Redi et al. | |
| 2005/0068154 A1* | 3/2005 | Beste | H04W 8/005 340/7.2 |
| 2006/0050670 A1* | 3/2006 | Hillyard | H04W 52/0251 370/338 |
| 2006/0245398 A1* | 11/2006 | Li | H04B 7/2668 370/335 |
| 2007/0041387 A1* | 2/2007 | Ghoshal | H04L 12/10 370/395.52 |
| 2007/0115816 A1* | 5/2007 | Sinivaara | H04W 28/18 370/230 |
| 2008/0130522 A1* | 6/2008 | Pennington | H04L 63/104 370/255 |
| 2009/0010186 A1* | 1/2009 | Li | H04W 52/243 370/310 |
| 2010/0110999 A1 | 5/2010 | Li et al. | |
| 2010/0167723 A1* | 7/2010 | Soumier | H04B 7/18506 455/431 |
| 2010/0280855 A1* | 11/2010 | Gupta | G06F 11/3006 709/223 |
| 2011/0086679 A1 | 4/2011 | Li et al. | |
| 2012/0258741 A1* | 10/2012 | Tillson | G01S 3/046 455/457 |
| 2012/0269072 A1* | 10/2012 | Wu | H04W 52/383 370/242 |
| 2013/0167159 A1* | 6/2013 | Ricci | G06F 9/54 719/319 |
| 2013/0298174 A1* | 11/2013 | Palm | H04L 12/12 725/80 |
| 2013/0305006 A1* | 11/2013 | Altman | G06F 3/0622 711/163 |
| 2014/0066082 A1* | 3/2014 | Anchan | H04M 3/00 455/452.1 |
| 2014/0094213 A1* | 4/2014 | Khoshnevis | H04W 52/383 455/522 |
| 2014/0136673 A1* | 5/2014 | Anpat | H04W 4/005 709/223 |
| 2014/0211702 A1* | 7/2014 | Turtinen | H04W 8/005 370/329 |
| 2014/0281046 A1* | 9/2014 | Morreale | G06F 13/385 710/8 |
| 2014/0301285 A1* | 10/2014 | Ahn | H04W 48/12 370/329 |
| 2014/0372775 A1* | 12/2014 | Li | H04L 49/405 713/300 |
| 2014/0376458 A1* | 12/2014 | Ryu | H04W 72/085 370/329 |
| 2015/0018017 A1* | 1/2015 | Jang | G01S 5/0284 455/456.5 |
| 2015/0078301 A1* | 3/2015 | Toth | H04W 76/023 370/329 |
| 2015/0201318 A1* | 7/2015 | Singh | H04W 8/005 455/434 |
| 2015/0215767 A1* | 7/2015 | Siomina | H04W 8/02 455/435.2 |
| 2015/0215903 A1* | 7/2015 | Zhao | H04W 72/04 370/329 |
| 2015/0215982 A1* | 7/2015 | Siomina | H04W 76/023 370/252 |
| 2015/0282108 A1* | 10/2015 | Kiss | H04W 60/00 455/435.1 |
| 2015/0289127 A1* | 10/2015 | Ou | H04W 8/005 455/426.1 |
| 2015/0327180 A1* | 11/2015 | Ryu | H04W 52/18 370/329 |
| 2015/0358802 A1* | 12/2015 | Nagata | H04W 8/005 370/329 |

OTHER PUBLICATIONS

International Search Report dated Jul. 8, 2014 in connection with International Application No. PCT/KR2014/002969; 3 pages.
Written Opinion of International Searching Authority dated Jul. 8, 2014 in connection with International Application No. PCT/KR2014/002969; 4 pages.

* cited by examiner

APPARATUS AND METHOD FOR DEVICE TO DEVICE COMMUNICATION BASED ON APPLICATION PROGRAM REQUIREMENTS IN A WIRELESS NETWORK

CROSS-REFERENCE TO RELATED APPLICATION AND CLAIM OF PRIORITY

The present application is related to and claims the benefit under 35 U.S.C. §119(a) of a Korean patent application No. 10-2013-0037208 filed in the Korean Intellectual Property Office on Apr. 5, 2013, the entire disclosure of which is incorporated herein by reference.

TECHNICAL FIELD

The present disclosure relates to an apparatus and method for Device to Device (D2D) communication in a wireless network, and more particularly, to an apparatus and method for setting a service range for D2D communication in a wireless network.

BACKGROUND

Along with the proliferation of wireless devices supporting wireless data communication, such as smartphones and the like, techniques for efficiently using radio resources have become a recent technical and social issue. Among the techniques, more and more interest has been attracted to D2D communication that enables direct communication between wireless device users without intervention of a Base Station (BS) and a network.

Advantageously, D2D communication in a wireless network increases the efficiency of radio resources, reduces power consumption of devices and the network, and expands the service area of the wireless network. Further, D2D communication can efficiently distribute the load of a BS supporting a large amount of content, based on proximity between devices.

D2D communication will find its use in physical applications by various techniques such as mobile to mobile communication, Machine to Machine (M2M) communication, Terminal to Terminal (T2T) communication, Peer to Peer Communication (P2P), and the like.

A source device supporting D2D communication transmits a discovery signal to discover devices around the source device. The discovery signal is transmitted with fixed power.

For example, even when applications having different requirements in proximity and discovery range are provided based on D2D communication, the source device transmits a discovery signal with preset power irrespective of the different requirements.

The discovery signal transmitted with the same strength irrespective of a service provided by the source device supporting D2D communication may unnecessarily interfere with other signals or may unnecessarily cause power consumption depending on a service that the discovery signal is associated with.

Accordingly, there is a need for developing a method for efficiently using a discovery signal for discovering neighboring devices in a device in order to provide a service by a D2D communication-based application.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for differentiating a discovery range for discovering a target device according to an application program based on Device to Device (D2D) communication by a source device in a wireless network.

An embodiment of the present disclosure provides an apparatus and method for controlling the transmission power of a discovery signal, taking into account proximity required for a selected application by a source device in a wireless network supporting D2D communication.

An embodiment of the present disclosure provides an apparatus and method for generating and processing range control information that determines a discovery range on an application basis by a source device in a wireless network supporting D2D communication.

An embodiment of the present disclosure provides an apparatus and method for transmitting information required for discovery during discovery for a specific application by a source device in a wireless network supporting D2D communication in order to control a discovery range directly or indirectly.

In an aspect of the present disclosure, a method of a source device for transmitting a discovery signal to support an application by Device to Device (D2D) communication in a wireless network includes acquiring range control information from an application upon selection of the application installed in the source device, controlling transmission power of a discovery signal for discovering a target device to conduct D2D communication, for the selected application based on range control information defined for the selected application, and transmitting the discovery signal with the controlled transmission power.

In another aspect of the present disclosure, an apparatus for transmitting supporting an application by D2D communication in a wireless network includes a controller configured to acquire range control information from an application upon selection of the application installed in the source device, controlling transmission power of a discovery signal for discovering a target device to conduct D2D communication, for the selected application based on range control information defined for the selected application, and a transmitter for transmitting the discovery signal with the controlled transmission power.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
FIG. 1 conceptually illustrates Device to Device (D2D) communication in a wireless network according to an embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure will be described below in the context of a Device to Device (D2D) network as a wireless network supporting D2D communication. However, it should not be interpreted that the technical features of the embodiments of the present disclosure are limited to the D2D network. In other words, it will be apparently understood in the art that the technical features of the embodiments of the present disclosure are also applicable to other wireless networks supporting D2D communication.

Particularly, an embodiment of the present disclosure provides an operation of a source device in regard to a selected D2D communication-based application with at least one target device. The source device transmits a discovery signal to discover at least one target device with which a D2D communication link is to be established. Preferably, the source device transmits the discovery signal to devices within a range suitable for servicing the application by D2D communication. For this purpose, range control information is defined according to proximity requirements of all or a part of applications installed in the source device in an embodiment of the present disclosure. The range control information includes range information that determines the propagation distance of a discovery signal transmitted by the source device. Besides, the range control information may selectively include data rate information and additional information required to perform an operation corresponding to the selected application.

Various methods for generating range control information and processing the range control information in a source device according to embodiments of the present disclosure will be described below in detail.

With reference to the attached drawings, the embodiments of the present disclosure will be described in detail.

FIG. 1 conceptually illustrates D2D communication in a wireless network according to an embodiment of the present disclosure. FIG. 1 is based on the assumption of D2D communication between one source device and one target device, for the convenience of description. That is, the embodiment of the present disclosure is also applicable to D2D communication between one source device and a plurality of target devices.

Referring to FIG. 1, at least one application is installed in a source device 10 and the source device 10 performs an operation in an application selected from the at least one application. For example, upon selection of a gas station search application, the source device 10 collects information about at least one gas station discovered within a range matching to a proximity requirement of the gas station search application. In another example, upon selection of a network-based game application, the source device 10 performs a game application-related operation with one device discovered within a range matching to a proximity requirement of the selected network-based game application.

Therefore, upon selection of a specific application, the source device 10 should be able to control a discovery range based on range control information defined for the selected application. For example, the source device 10 controls the transmission power of a discovery signal to be transmitted to discover a target device 20 based on the range control information. In addition, the source device 10 controls interference during a D2D operation in the selected application.

Further, in the presence of additional information required for the target device 20 to execute the selected application, the source device 10 can include the additional information in the discovery signal.

As described above, the source device 10 defines range control information matching to a proximity requirement of each installed application and transmits a discovery signal based on the defined range control information, so that the source device 10 can conduct D2D communication with the target device 20 within a desired discovery range of the application.

For example, different discovery ranges should be applied to a social game application and a gas station search application. For the gas station search application, the discovery range is preferably larger than for the social game application.

The target device 20 establishes a D2D communication link with the source device 10 and performs an operation in a specific application via the link, upon request of the source device 10. For example, the target device 20 can execute the social game application or provide requested information to the source device 10, upon request of the source device 10. For example, if the target device 20 receives additional information from the source device 10, the target device 20 provides information generated based on the additional information to the source device 10.

To establish the D2D communication link with the source device 10, the target device 20 should be able to receive a discovery signal from the source device 10. When needed, the target device 20 should be able to transmit a response signal to the discovery signal to the source device 10.

Figure 2:
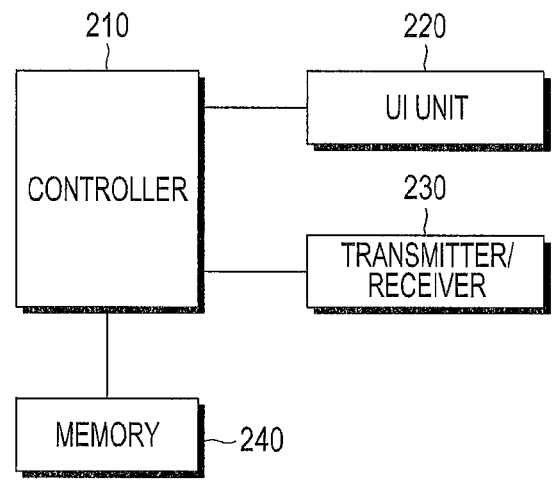
FIG. 2 is a block diagram of a source device according to an embodiment of the present disclosure.

FIG. 2 is a block diagram of a source device according to an embodiment of the present disclosure. Only components for transmitting a discovery signal by controlling the transmission power of the discovery signal for the purpose of discovering a target device to support a specific application by D2D communication from among the components of the source device are shown in FIG. 2.

Referring to FIG. 2, upon select of one of applications installed in the source device, a controller 210 checks range control information defined for the selected application. The application can be selected by a user or in conjunction with another application. Additionally, the application can be selected in many other manners.

The controller 210 controls discovery of at least one target device based on the range control information about the application. A target device refers to a device for executing the selected application by D2D communication.

For example, the controller 210 controls transmission of a discovery signal to discover at least one target device. That is, the controller 210 determines a propagation distance for the discovery signal, taking into account the range control information about the selected application and controls the transmission power of the discovery signal to cover the propagation distance.

Further, the controller 210 can perform interference control during execution of the selected application by D2D communication based on the range control information.

Upon receipt of a user request for changing the range control information, the controller 210 can control the transmission power of the discovery signal based on the changed range control information.

A memory 240 stores a program related to at least one installed application. Further, the memory 240 stores range control information defined for each of the at least one installed application. Upon request of the controller 210, the memory 240 invokes and activates a selected application and outputs range control information defined for the selected application. Generation of the range control information can be triggered by execution of the invoked application, rather than the range control information is predefined for the application.

A User Interface (UI) unit 220 interfaces with a user authorized to access the source device. For example, the UI unit 220 transmits information input through a user manipulation to the controller 210 or provides necessary information to the user under the control of the controller 210. Particularly, the UI unit 220 indicates the types of installed applications to the user and upon user selection of one of the applications, provides selection information about the selected application to the controller 210.

A transmitter/receiver 230 discovers neighbor devices for D2D communication under the control of the controller 210 and performs an operation for establishing a link with one or more of the discovered devices. For example, the transmitter/receiver 230 transmits a discovery signal to discover a target device within a discovery range matching to a proximity requirement of a selected application under the control of the controller 210. To discover a target device within a desired discovery range, the transmitter/receiver 230 controls the transmission power of the discovery signal under the control of the controller 210. Further, the transmitter/receiver 230 performs interference control during transmission of the discovery signal or during execution of the selected application by D2D communication, under the control of the controller 210.

Functions of the controller 210 illustrated in FIG. 2 can be performed logically by an application, in middleware, or in a modem that processes signals for communication.

Figure 3:
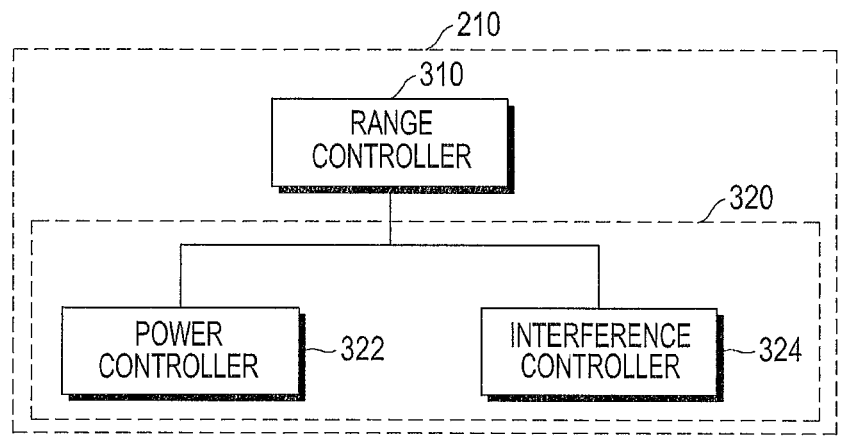
FIG. 3 is a block diagram of a structure for performing range control in a source device according to an embodiment of the present disclosure.

FIG. 3 is a block diagram of a structure for performing range control in a source device according to an embodiment of the present disclosure.

Referring to FIG. 3, upon selection of an application, a range controller 310 receives range control information that defines a requirement (for example, a proximity requirement) of the selected application. Various methods for providing range control information to the range controller 310 will be described later.

The range controller 310 generates power control information and interference control information based on the received range control information. For example, the power control information and the interference control information will be used to control the transmission power of a discovery signal to satisfy the proximity requirement of the selected application.

For this purpose, the range controller 310 provides the generated power control information and interference control information to a physical controller 320. The physical controller 320 refers to a hardware structure for providing overall control to transmission or reception of a signal, data, or information.

For example, the physical controller 320 can be configured so as to include a power controller 322 for controlling transmission power and an interference controller 324 for controlling interference. The power controller 322 controls the transmission power of a discovery signal based on the power control information received from the range controller 310. The discovery signal is transmitted to discover a target device that will perform an operation related to the selected application, within a discovery range matching to the proximity requirement of the selected application. Therefore, the discovery signal will be transmitted with a signal strength controlled by the power controller 322, so that only devices within the discovery range matching to the proximity requirement of the selected application can receive the discovery signal.

The interference controller 324 controls interference generated during transmission of the discovery signal or during transmission of information in relation to execution of the application by D2D communication based on the interference control information received from the range controller 310.

While the range controller 310 and the physical controller 320 are shown in FIG. 3 as incorporated into a controller of the source device, the controller of the source device can include only the range controller 310, and the physical controller 320, that is, the power controller 322 and the interference controller 324 can be provided in a transmitter/receiver of the source device. Functions of the range controller 310 can be executed logically in an application, in new hardware such as middleware or the like, or in existing hardware such as a modem or the like.

Figure 4:
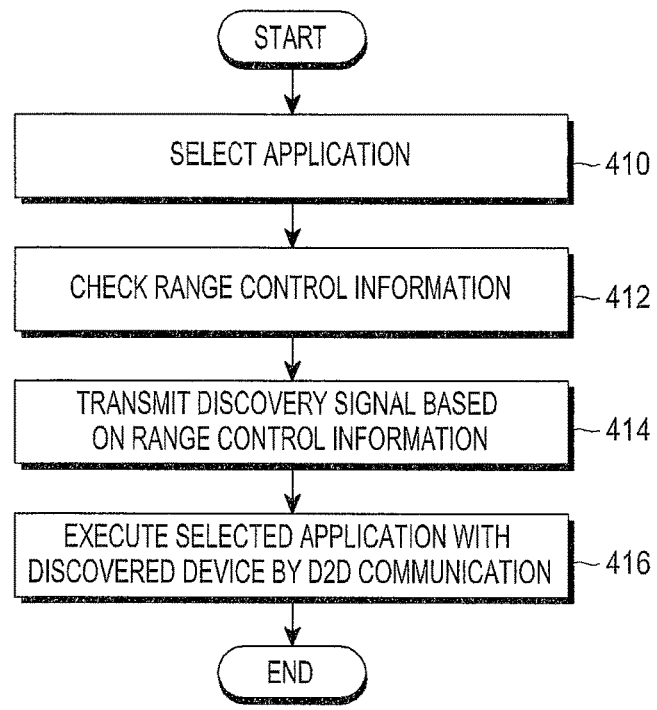
FIG. 4 is a flowchart illustrating a control operation for executing an application by D2D communication in a source device according to an embodiment of the present disclosure.

FIG. 4 is a flowchart illustrating a control operation for executing an application based on D2D communication in a source device according to an embodiment of the present disclosure.

Referring to FIG. 4, the source device selects an application from among at least one application installed in the source device in operation 410. The application can be selected by a user request or a request from another application being executed.

The selected application is executed in conjunction with another device by D2D communication. For example, the D2D communication-based application can be a social game application, an application for providing guidance to search for a restaurant, a gas station, or the like.

The source device checks range control information defined for the selected application in operation 412. The range control information is defined to set a proximity degree required for the selected application, that is, a discovery range within which a neighbor device to execute the selected application together will be discovered. For example, if a neighbor device is to be discovered by a discovery signal, the range control information includes range information indicating a propagation distance of the discovery signal.

The range control information can be a default value for each application. In this case, range information can be provided according to an application type, not based on a value of range information. For example, in the case of a friend search application, maximum range information can be provided, even though range information is not provided. In addition, a range set to a specific value for an application can be range control information about the application.

Besides, the range control information can include information about a data rate to be provided during an operation of the selected application by D2D communication. The range control information can include additional information to be provided to a target device with which a source device is to perform an operation related to the selected D2D communication-based application. For example, if the gas station search application is selected, range control information includes information that a user wants to search, that is, information indicating that an intended search target is a gas station.

The source device can acquire range control information about the selected application from a predefined mapping table that maps each installed application to range control information. In another example, the source device can acquire range control information generated along with execution of the selected application.

Irrespective of how the source device acquires range control information among the above-described methods, there is no difference in the configuration of the acquired range control information. One thing to note herein is that the range control information can be defined differently according to a proximity degree required for each application. For example, range control information indicating a radius of 100 meters as a discovery range can be defined for a social game application based on D2D communication and range control information indicating a radius of 1000 meters as a discovery range can be defined for a gas station search application based on D2D communication.

The source device transmits a discovery signal based on the acquired range control information. That is, the source device controls the transmission power of the discovery signal, taking into account range information included in the range control information. In addition, the source device can control a Modulation and Coding Scheme (MCS) level, resource selection, retransmission (HARQ), and the like based on the range information included in the range control information. If the source device controls an MCS level or indicates use or non-use of retransmission based on the range information, high-reliability communication is possible. Further, a resource scheduling gain can be achieved by selecting resources based on the range information.

In general, transmission power, MCS level, resource selection, retransmission, and the like are significant factors that determine the propagation distance of a transmission signal. Accordingly, the source device can discover a target device that satisfies the proximity requirement of the selected application.

For example, the source device uses relatively high transmission power, a relatively high MCS level, or a retransmission scheme for an application requiring a high proximity degree, compared to an application requiring a low proximity degree. Thus a high-reliability discovery signal can be transmitted. That is, as the required proximity degree increases, the source device increases the transmission power of a discovery signal, uses a higher MCS level, or adopts a retransmission scheme, for high-reliability communication. On the other hand, if the required proximity degree decreases, the source device uses a lower MCS level or does not use a retransmission scheme, thereby enabling efficient signal transmission.

In other words, a target device can be discovered within a large discovery range for an application having a high proximity requirement and within a small discovery range for an application having a low proximity requirement. That is, for an application requiring a low proximity degree, the source device establishes a D2D communication link with a relatively nearby target device and executes an intended application via the D2D communication link, compared to an application requiring a high proximity degree.

Meanwhile, if the acquired range control information includes additional information for the selected application, the source device can transmit the additional information together with the discovery signal. If the acquired range control information includes data rate information, the source device considers a data rate indicated by the data rate information in transmitting a signal related to the application by D2D communication.

The source device establishes a D2D communication link with at least one target device discovered by transmitting the discovery signal and executes the selected application with the target device via the D2D communication link in operation 416. The discovered at least one target device can be a device that can execute the application from among devices located within a discovery range matching to the proximity requirement of the application.

For example, if the social game application has been selected, upon execution of the social game application with at least one target device which has been discovered by a discovery signal and with which a D2D communication has been established, the source device provides content to the target device. If the gas station search application has been selected, the source device provides information about a nearby gas station discovered by a discovery signal to a user.

As described above, the source device controls the transmission power of a discovery signal to adjust a propagation distance of the discovery signal according to a proximity requirement of a selected application. When needed for an operation in the selected application, the source device can transmit additional information to execute the selected application along with the discovery signal.

Figure 5:
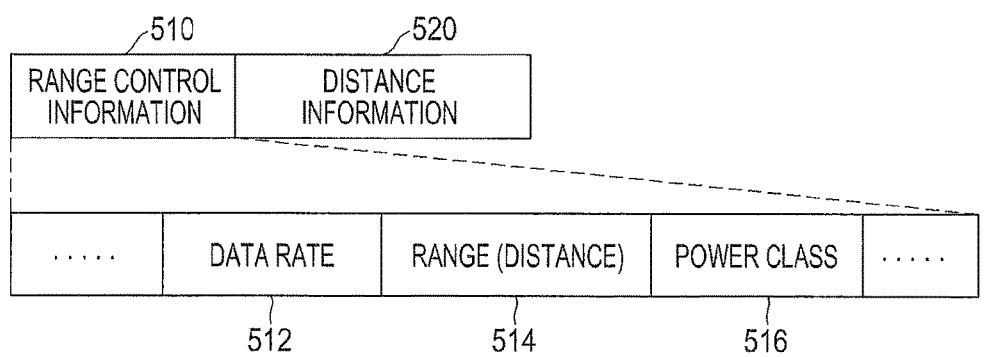
FIG. 5 illustrates an example range control information defined on an application-by-application basis in a source device according to an embodiment of the present disclosure.

FIG. 5 illustrates an example of range control information defined on an application-by-application basis in a source device according to an embodiment of the present disclosure.

Referring to FIG. 5, additional information 520 (herein, distance information 520) as well as range control information 510 is provided to perform a different operation for each application.

As described before, the additional information 520 can be information that should be shared with a target device to perform an operation in a selected application. For example, if the user of the source device executes the gas station search application, the source device can need to transmit information indicating that nearby gas station information is required as additional information along with a discovery signal.

The range control information 510 can include a data rate 512, a range (distance) 514, and a power class 516. The data rate 512 is used to determine a data rate at which data is to be transmitted in a selected application via an established D2D communication link. The range (distance) 514 is used to control the transmission power of a discovery signal.

The power class 516 can be used to determine how far the source device is apart from a target device. For example, the target device can determine the distance to the source device using the power class 516.

For example, if the source device is to transmit a signal for which range information is set to 100 m, the source device can set, as power information, a decrement or increment of transmission power covering 100 m from a reference value. The reference value can be determined according to the maximum transmission power or device configuration of a terminal.

Thus, when the source device provides the power information to the target device, the target device can check the received power information and estimate the distance to the source device based on the power information. Herein, distance estimation can amount to distance calculation.

For example, if target devices are respectively 50 m and 100 m apart from the source device, the source device transmits a signal to cover 100 m. Therefore, the target devices do not know how they are apart from the source device. However, if the source device transmits a signal together with power information, each target device can estimate its distance to the source device using the power information.

The discovery signal is transmitted for the purpose of discovering a target device with which a D2D communication link is to be established. In addition, the range (distance) 514 can be used to control interference of data transmission during a D2D communication-based operation in the selected application.

For example, the range information can be defined as classes. For example, Class 1, 2, 3, . . . or Class Low, Middle, and High can be set as range information defined for each application. In another example, the range information can be set to a value (a positive integer) indicating an actual distance. That is, a discovery range can be set to a user-desired value, such as 100, 1000, or the like. Herein, 100 means that the discovery range is 100 m and 1000 means that the discovery range is 1000 m.

The data rate information can be defined in the same manner. For example, data rate information defined for each application can be set to Class 1, 2, 3, . . . or Class Low, Middle, and High. In another example, the data rate information can be set to a value (a positive integer) indicating an actual data rate. That is, the data rate information can be set to a user-desired value, such as 10, 100, or the like. Herein, 10 means that the data rate is 10 Mbps and 100 means that the data rate is 100 Mbps.

The power information can be defined in the same manner. For example, power information defined for each application can indicate Class 1, 2, 3, . . . or Class Low, Middle, and High. In another example, the power information can be set to an actual power level. If the power information is set to 1, this means that the power level is 1 dBm and if the power information is set to 2, this means that the power level is 2 dBm.

Meanwhile, the data rate information can be configured in such a manner that information about an application requiring a high data rate can be provided before a communication connection and a signal can be transmitted with higher transmission power based on the data rate information after the communication connection, when needed.

In summary, a user can search for a desired service within an intended radius using range information included in range control information and additional information. For example, the range information can be set to '1000' and the data rate information is set to '0', the power information can be set based on the range information and the data rate, and the additional information can be set to indicate 'gas station'. The range information set to '1000' indicates 1000 meters, and the data rate information set to '0' indicates no data rate or use of a default data rate set for an application. In this case, the source device can collect information about gas stations within 1000 m by D2D communication.

To implement the above-described embodiments of the present disclosure, there is a need for a method for generating and processing range control information in a source device. That is, a structure for providing range control information, as defined for range control, generated in an application directly to Layer 2 (L2) and thus controlling a discovery signal according to its distance is required.

Figure 6:
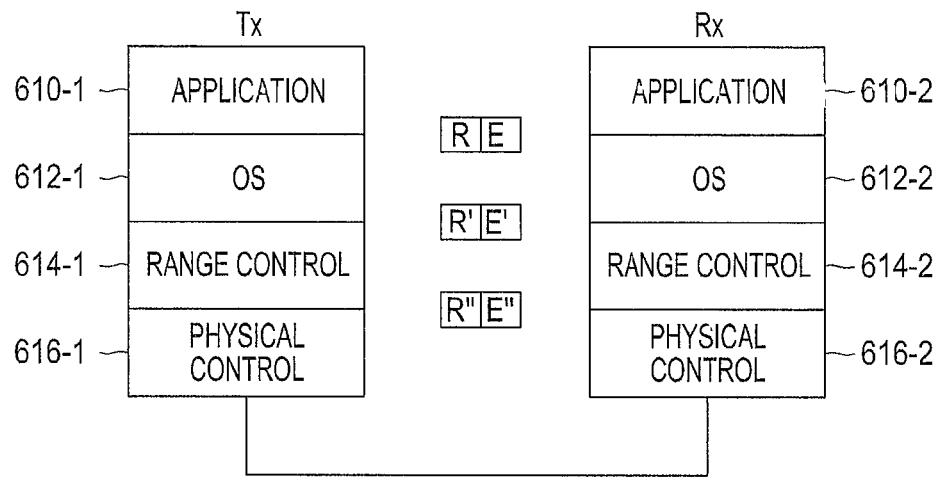
FIG. 6 illustrates processing range control information between a transmitting device and a receiving device in a wireless network supporting D2D communication according to an embodiment of the present disclosure.

FIG. 6 illustrates an operation for processing range control information between a transmitting device and a receiving device in a wireless network supporting D2D communication according to an embodiment of the present disclosure.

Upon execution of an application supporting the role of a range controller that provides information needed for control of transmission power, interference, and the like in a physical layer or a transmission layer operating similarly to the physical layer or the role of a device having the range controller, the operation illustrated in FIG. 6 is initiated.

Referring to FIG. 6, an application layer 610-1 of the transmitting device generates initial range control information which is basically applied upon execution of an application. For example, the initial range control information has default values. For example, the default values include Range High and Data Rate Low, or Range 1000, Data Rate 0, and user-interest information. The initial range control information can be changed to a user-desired value in the application, upon user request. For example, the initial range control information can be changed to a user-set value or a user-desired value or class through application setting.

The range control information generated from the application layer 610-1 is provided to a range control layer 614-1 through a kernel of an Operating System (OS) layer 612-1 or by TCP/IP socket communication of the OS layer 612-1.

A message including the range control information provided through the OS kernel or TCP/IP communication is encapsulated by an Application Programming Interface (API). In FIG. 6, R containing Range, Data Rate, Power Class, and the like and E containing user-interested information in a pre-encapsulation message are converted to R' and E' by encapsulation.

The range control layer 614-1 provides R" and E" as range control information suitable for processing in a physical layer or a transmission layer operating similar to the physical layer by interpreting the encapsulated information. The Range, Date Rate, Power Class, and the like are encapsulated in R", whereas the user-interested information (for example, a gas station or the like) is encapsulated in E".

In summary, the range control layer 614-1 provides necessary information based on the range control information received from the application layer 610-1 to the physical layer or the transmission layer so as to control an antenna, a power amplifier, and the like for transmission. Herein, both R" and E" can be transmitted or only E" can be transmitted. The range control layer 614-1 further controls transmission of a discovery signal based on the range control information generated from the application layer 610-1. Thus the discovery signal can be managed efficiently.

A physical control layer 616-2 of the receiving device receives the range control information from a physical control layer 616-1 of the transmitting device. The information received in the physical control layer 616-2 can be both R" and E" or only E". R" contains information such as the Range, the Data Rate, the Power Class, and the like, and E" contains the user-interested information (for example, a gas station or the like).

The physical control layer 616-2 transmits the received R" and E" or E" to a range control layer 614-2. The range control layer 614-2 recovers R' and E' or E' from the received R" and E" or E". R' contains the range control information and E' contains the user-interested information (for example, a gas station or the like).

The recovered R' and E' or the received E' is provided to an OS layer 612-2. R' and E', or E' is recovered to R and E or E through a kernel of the OS layer 612-2. Herein, R contains the range control information and E contains the user-interested information (for example, a gas station or the like).

An application layer 610-2 of the receiving device can acquire the Range, the Data Rate, the Power Class, and the user-interested information that the transmitting device requires, from R and E, or E received from the OS layer 612-2.

The above-described receiving device can reuse R and E, or E in an application later. If the corresponding information is not needed, the receiving device can delete the information.

Now a detailed description will be given of various methods for generating and processing range control information in a source device. It is assumed that the source device includes a range controller for controlling a discovery range and a device driver.

There are two methods: one of the methods is to provide range control information directly to the range controller by an API of the device drover and the other method is to provide range control information directly to the range controller by a Differentiated Services Code Point (DSCP) class in an IP header by TCP/IP.

In the first method, an application generates range control information and transmits the range control information directly to the range controller by the API of the device driver.

In the second method, when a communication socket is connected in an application, a similar effect is achieved by setting Quality of Service (QoS) using a class set by the DSCP of an IP header.

Figure 7:
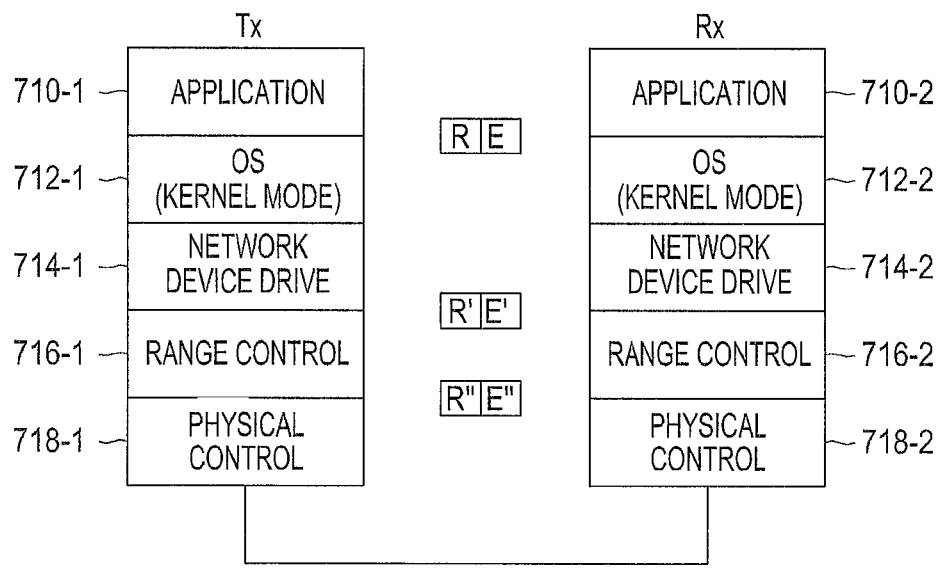
FIG. 7 illustrates an example transmitting range control information through an Application Programming Interface (API) in a D2D device according to an embodiment of the present disclosure.

FIG. 7 illustrates an example of transmitting range control information by an API in a D2D device according to an embodiment of the present disclosure. In FIG. 7, when a range control layer is used, a device driver is adopted. The device driver can include an application area, an OS kernel area, and a hardware area.

The application area can access a device drive area through a system call interface (API) of the OS kernel area. The device drive area can control the hardware area directly through a device interface (API).

Referring to FIG. 7, an application layer 710-1 generates range control information and provides the range control information to a device drive layer 714-1. That is, the range control information generated by the application layer 710-1 can be provided directly to a range control layer 716-1 through a device interface (API) using the network device drive layer 714-1.

The range control layer 716-1 interprets the received range control information and converts the range control information to information suitable for processing in a physical control layer 718-1 or a transmission layer operating similarly to the physical control layer 718-1. As the range control layer 716-1 provides the converted information to the physical control layer 718-1 or the transmission layer, the physical control layer 718-1 or the transmission layer can control a discovery signal suitably for an intended application.

Figure 8:
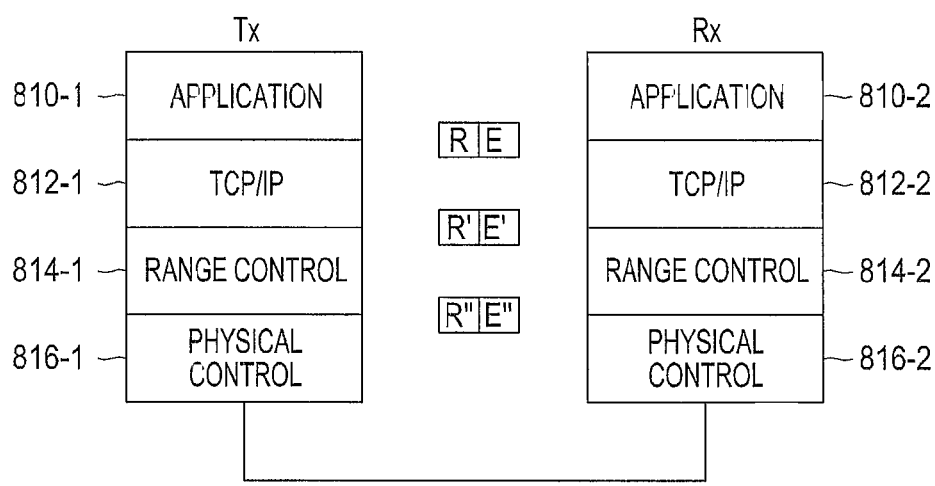
FIG. 8 illustrates an example transmitting range control information by Transmission Control Protocol/Internet Protocol (TCP/IP) in a D2D device according to an embodiment of the present disclosure.

FIG. 8 illustrates an example of transmitting range control information by TCP/IP in a D2D device according to an embodiment of the present disclosure. In FIG. 8, when a range control layer is used, TCP/IP is adopted.

Referring to FIG. 8, an application layer 810-1 generates range control information. An example of the range control information is illustrated in FIG. 5.

The application layer 810-1 provides the range control information to a TCP/IP layer 812-1. The TCP/IP layer 812-1 transmits the range control information in a DSCP part of an IP header to a network device drive layer 716-1.

For example, upper 6 bits out of 8 bits defining a previous Type of Service (ToP) in the IP header corresponds to the DSCP part. If the DSCP part is used to distinguish classes, the upper 6 bits corresponding to the DSCP part can represent 64 classes. The remaining classes except classes allocated to represent priority levels among the 64 classes can be used to indicate QoS for each class.

For example, if Class 1 to Class 24 are allocated to represent priority levels among the 64 classes, a part or all of Class 25 to Class 64 can be used to indicate QoS for each class.

That is, if range control information is used to provide only range information, Classes 25, 26, and 27 can be used to indicate Low Range, Middle Range, and High Range, respectively.

On the other hand, if the range control information includes data rate information, range information and data rate information can be defined by separate classes or in one class. For example, Class 28 can be set to indicate Range Low and Data Rate Low, and Class 29 can be set to indicate Range Low and Data Rate High.

In another example, if range control information is defined by QoS, parameters such as required power, interference, and the like can be set separately for each class. The parameters can be used to control transmission power or interference, when a discovery signal is transmitted or an intended application is executed by D2D communication.

In an embodiment of allocating a class using a DSCP part of an IP header, the application layer 810-1 can generate a socket for TCP/IP communication, directly set a class value using the generated socket API, and provide the class value to the range control layer 814-1.

Information suitable for processing in the physical control layer 816-1 or the transmission layer operating similarly to the physical control layer 816-1 can be provided using the classification of QoS for executing a selected application based on the DSCP-based classification. Thus, a discovery signal for which transmission power and interference are controlled can be managed efficiently.

A physical control layer 816-2 of a receiving device provides the range control information received from the physical control layer 816-1 of a transmitting device to a range control layer 814-2. The range control layer 814-2 transmits the range control information to an application layer 810-2 through a TCP/IP layer 812-2.

Meanwhile, if QoS is used as range control information, a different implementation example can be applied depending on whether a range control structure is separately configured.

For example, in the absence of a range control structure, that is, a range controller, information about a class corresponding to QoS set by a higher layer is provided directly to a scheduler. Herein, information about the class corresponding to the QoS is a class related to an additionally set range and data rate.

In this case, the scheduler determines parameters such as power, interference, and the like for each class indicated by QoS-based classification information and provides the parameters to the physical control layer that performs power control and interference control or the transmission layer operating in a similar manner. For example, the parameters provided to the physical control layer or the transmission layer can be power information and interference information.

In another example where a range control structure, that is, a range controller exists, information about a class corresponding to QoS set by a higher layer is provided to the range control layer. The range control layer changes parameters such as power, interference, and the like based on the received class information and provides power information and interference information based on the changed parameters so that the physical control layer or the transmission layer can perform power control and interference control.

As is apparent from the foregoing description, according to the embodiments of the present disclosure, the whole performance of a wireless network system supporting D2D communication can be improved by controlling signal strength, interference, and the like according to a requirement for each application.

Further, rather than transmission power is simply reduced during discovery, unnecessary interference between devices can be mitigated, which might otherwise be caused by transmission of a signal with a preset signal length, and forcing a device and a user to search for unnecessary information can be decreased.

Other effects that can be achieved or inferred by embodiments of the present disclosure are disclosed implicitly or explicitly in the following detailed description of the embodiments of the present disclosure. In other words, various effects that can be achieved from the embodiments of the present disclosure will be disclosed in the detailed description as given below.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for supporting device to device (D2D) communication by a first device in a wireless network, the method comprising:
   identifying a range class for an application from range classes for a plurality of applications;
   controlling a transmission power of a discovery signal based on the identified range class;
   transmitting the discovery signal with the controlled transmission power to a second device; and
   transmitting, to the second device, information including the controlled transmission power of the discovery signal and a data rate required in the application, wherein the transmission power of the discovery signal for the identified range class is controlled differently than a transmission power of a discovery signal for other range classes, and
   wherein the information is used for determining a distance between the first device and the second device.

2. The method of claim 1, wherein the information further comprises information associated with the application and the information is transmitted through the discovery signal.

3. The method of claim 1, wherein the range classes are determined based on range control information including range information that specifies a propagation distance of the discovery signal and further including at least one of data rate information, power information, and additional information needed to perform an operation corresponding to the application.

4. The method of claim 3, wherein: the range information is defined by class information corresponding to the propagation distance of the discovery signal or numerical information indicating the propagation distance of the discovery signal, the at least one of the data rate information is defined by class information corresponding to a data rate or numerical information indicating the data rate, and the power information is defined by class information corresponding to a power level or numerical information indicating the power level.

5. The method of claim 3, further comprising:
if the range control information is changed by a user request, controlling transmission power of the discovery signal for discovering a target device to conduct D2D communication.

6. The method of claim 3, wherein if the range control information includes additional information needed to perform an operation corresponding to the application in the second device, the additional information is included in the discovery signal.

7. The method of claim 1, further comprising:
additionally controlling at least one of a modulation and coding scheme (MCS), use or non-used of retransmission, and resource scheduling based on range control information defined for the application.

8. The method of claim 1, further comprising: performing interference control during D2D communication for the application based on range control information defined for the application.

9. The method of claim 1, wherein after range control information is generated upon execution of the application, the range control information is directly provided to a range controller configured to control the transmission power of the discovery signal via a system call interface of a device driver.

10. The method of claim 1, wherein after range control information is generated upon execution of the application, the range control information is directly provided to a range controller configured to control the transmission power of the discovery signal, using a differentiated services code point (DSCP) class in an internet protocol (IP) header by transmission control protocol/internet protocol (TCP/IP).

11. An apparatus for supporting an application by device to device (D2D) communication in a wireless network, the apparatus comprising:
a controller configured to:
identify a range class for an application from range classes for a plurality of applications;
control a transmission power of a discovery signal based on the identified range class; and
a transmitter configured to transmit, to a second device, the discovery signal with the controlled transmission power and information including the controlled transmission power of the discovery signal and a data rate required in the application, wherein the transmission power of the discovery signal for the identified range class is controlled differently than a transmission power of a discovery signal for other range classes, and
wherein the information is used for determining a distance between a first device and the second device.

12. The apparatus of claim 11, wherein the information further comprises information associated with the application and the information is transmitted through the discovery signal.

13. The apparatus of claim 11, wherein the range classes are determined based on range control information including range information that specifies a propagation distance of the discovery signal and further including at least one of data rate information, power information, and additional information needed to perform an operation corresponding to the application.

14. The apparatus of claim 13, wherein: the range information is defined by class information corresponding to the propagation distance of the discovery signal or numerical information indicating the propagation distance of the discovery signal, the at least one of the data rate information is defined by class information corresponding to a data rate or numerical information indicating the data rate, and the power information is defined by class information corresponding to a power level or numerical information indicating the power level.

15. The apparatus of claim 13, wherein if the range control information is changed by a user request, the controller is configured to control transmission power of the discovery signal for discovering a target device to conduct D2D communication.

16. The apparatus of claim 13, wherein if the range control information includes additional information needed to perform an operation corresponding to the application in the second device, the controller is configured to control the transmitter to include the additional information in the discovery signal.

17. The apparatus of claim 11, wherein the controller is additionally configured to control at least one of a modulation and coding scheme (MCS), use or non-used of retransmission, and resource scheduling based on range control information defined for the application.

18. The apparatus of claim 11, wherein the controller is configured to control the transmitter for interference control during D2D communication for the application based on range control information defined for the application.

19. The apparatus of claim 11, wherein after range control information is generated upon execution of the application, the range control information is directly provided to the controller configured to controls the transmission power of the discovery signal via a system call interface of a device driver.

20. The apparatus of claim 11, wherein after range control information is generated upon execution of the application, the range control information is directly provided to the controller that controls the transmission power of the discovery signal, using a differentiated services code point (DSCP) class in an internet protocol (IP) header by transmission control protocol/internet protocol (TCP/IP).

* * * * *